(12) United States Patent
Sparrow et al.

(10) Patent No.: US 9,266,747 B1
(45) Date of Patent: Feb. 23, 2016

(54) MULTIPLE EFFECT CONCENTRATION SWAP DE-SCALING SYSTEM

(71) Applicant: Saltworks Technologies Inc., Vancouver (CA)

(72) Inventors: Benjamin Stuart Sparrow, Vancouver (CA); Saqib Naveed, Vancouver (CA)

(73) Assignee: SALTWORKS TECHNOLOGIES INC., Vancouver, British Columbia (CA)

( * ) Notice: Subject to any disclaimer, the term of this patent is extended or adjusted under 35 U.S.C. 154(b) by 0 days.

(21) Appl. No.: 14/427,043

(22) PCT Filed: Nov. 26, 2014

(86) PCT No.: PCT/CA2014/051134
§ 371 (c)(1),
(2) Date: Mar. 10, 2015

(87) PCT Pub. No.: WO2015/077887
PCT Pub. Date: Jun. 4, 2015

Related U.S. Application Data

(60) Provisional application No. 61/909,288, filed on Nov. 26, 2013.

(51) Int. Cl.
*C02F 1/04* (2006.01)
*C02F 1/06* (2006.01)
(Continued)

(52) U.S. Cl.
CPC . *C02F 1/06* (2013.01); *B01D 3/065* (2013.01); *B01D 3/143* (2013.01); *B01D 3/146* (2013.01);
(Continued)

(58) Field of Classification Search
CPC ........ B01D 3/065; B01D 3/143; B01D 3/146; B01D 3/42; B01D 1/26; B01D 1/265; B01D 5/0036; C02F 2103/08; C02F 2103/10; C02F 2301/08
See application file for complete search history.

(56) References Cited

U.S. PATENT DOCUMENTS 2,971,897 A * 2/1961 Chapman ................ C02F 1/042
15/104.16
3,351,120 A * 11/1967 Goeldner ................ B01D 1/26
159/13.3
(Continued)

FOREIGN PATENT DOCUMENTS

CA 2816746 A1 11/2012
CA 2821453 A1 11/2012
(Continued)

OTHER PUBLICATIONS

International Search Report and Written Opinion mailed Feb. 10, 2015 for related PCT Application No. PCT/CA2014/051134.

*Primary Examiner* — Renee E Robinson
*Assistant Examiner* — Jonathan Miller
(74) *Attorney, Agent, or Firm* — Troutman Sanders LLP; Ryan A. Schneider; Benjamin C. Wiles

(57) ABSTRACT

A multistage thermal desalination system, together with its associated method of use, allows de-scaling of subsystems exposed to saturated saltwater by alternating the saturation stage of the process between two neighboring physical desalination stages. The desalination system is provided with at least one transfer conduit, at least one pump, and valving to permit saltwaters being desalinated by higher and lower stage desalination subsystems to be swapped. By replacing the saturated saltwater in a higher salt concentration desalination subsystem with lower salt concentration saltwater, the scaling in higher salt concentration desalination subsystem is reduced while the saturation load is placed on another of the desalination subsystems.

54 Claims, 3 Drawing Sheets

(51) Int. Cl.
  *C02F 1/26* (2006.01)
  *B01D 3/06* (2006.01)
  *B01D 3/14* (2006.01)
  *B01D 3/42* (2006.01)
  *C02F 1/00* (2006.01)
  *B01D 5/00* (2006.01)
  *C02F 103/08* (2006.01)
  *C02F 103/10* (2006.01)

(52) U.S. Cl.
  CPC ........... *B01D 3/42* (2013.01); *B01D 5/0036* (2013.01); *C02F 1/008* (2013.01); *C02F 1/042* (2013.01); *C02F 1/265* (2013.01); *C02F 2103/08* (2013.01); *C02F 2103/10* (2013.01); *C02F 2209/005* (2013.01); *C02F 2209/03* (2013.01); *C02F 2209/05* (2013.01); *C02F 2209/40* (2013.01); *C02F 2301/08* (2013.01)

(56) References Cited

U.S. PATENT DOCUMENTS

| | | | | |
|---|---|---|---|---|
| 3,839,160 | A * | 10/1974 | Izumi | B01D 3/065 159/17.3 |
| 3,844,899 | A * | 10/1974 | Sager, Jr. | C02F 1/06 159/18 |
| 5,582,690 | A * | 12/1996 | Weinberger | F01K 3/00 159/17.1 |
| 5,730,836 | A * | 3/1998 | Greig | B01D 3/065 159/17.1 |
| 5,925,223 | A * | 7/1999 | Simpson | B01D 3/065 159/17.1 |
| 7,251,944 | B2 * | 8/2007 | Holtzapple | B01D 1/0058 62/333 |
| 7,799,178 | B2 * | 9/2010 | Eddington | B01D 1/26 159/13.2 |
| 7,850,826 | B2 * | 12/2010 | Alt | B01D 1/04 159/2.1 |
| 7,922,874 | B2 * | 4/2011 | Ophir | B01D 1/26 159/17.1 |
| 2002/0166758 | A1 * | 11/2002 | Vinz | B01D 1/26 203/2 |
| 2008/0083605 | A1 * | 4/2008 | Holtzapple | C02F 1/041 203/11 |
| 2010/0089740 | A1 * | 4/2010 | Vuong | C02F 1/042 203/10 |
| 2014/0197022 | A1 * | 7/2014 | Antar | C02F 1/14 202/174 |

FOREIGN PATENT DOCUMENTS

| | | |
|---|---|---|
| CA | 2821458 A1 | 11/2012 |
| CA | 2818055 A1 | 8/2013 |

* cited by examiner

MULTIPLE EFFECT CONCENTRATION SWAP DE-SCALING SYSTEM

CROSS-REFERENCE TO RELATED APPLICATIONS

This application is a US National Stage of International Application No. PCT/CA2014/051134, filed 26 Nov. 2014, which claims the benefit of U.S. Provisional Patent Application No. 61/909,288, filed 26 Nov. 2013, each herein fully incorporated by reference.

TECHNICAL FIELD

The present disclosure provides a method to improve the reliability of multiple effect evaporation or flash desalination processes. More specifically, the method periodically swaps the concentration of the saltwater processed in each effect to enable de-scaling during operation.

BACKGROUND

Treatment of waste saltwater to reduce volume is becoming increasingly important, particularly for mining, oil and gas, and inland desalination systems. Mines can produce tailings water, which is typically ponded. Oil and gas operations can produce saltwater within the hydrocarbon reserve or during processing. Desalination is increasingly being used in both industries as regulations require treatment of impaired water. Desalination is also used in coastal regions to produce freshwater from seawater, with the more saline brine reject returned to the ocean. Inland brackish water can be desalted; however, there is often no convenient way to dispose of the brine reject.

Common brine reject management options include discharge to a sewer or the environment, ponding, deep well injection, or treatment to produce solid salt in concentrators and crystallizers. The first two methods are becoming more challenging to use due to tightening environmental regulations and associated costs. This is moving the emphasis to so-called Zero Liquid Discharge (ZLD) processes. In such processes, concentrators and crystallizers are used to distil water and produce solids, which can then be landfilled or put to secondary use. Due to the need to operate at high concentrations that exceed the osmotic pressure limits of reverse osmosis systems, such ZLD processes involve an evaporation-condensation cycle. In such evaporation-condensation cycles, the water in the saline saltwater waste is evaporated to a nearly pure vapor and condensed to recover nearly pure liquid water. Despite their popularity, ZLD processes are expensive, costing roughly five times as much as employing traditional deep wells. ZLD processes also experience considerable reliability challenges due to the inherent saturation point operation.

The capital costs of ZLD processes are high due to the extensive use of alloyed steels and titanium required at the operating temperatures and pressures. Energy costs are high due to the use of large volume compressors, which on average consume 20 to 60 kWh of electrical-mechanical power per cubic meter treated.

Considerable effort has been focused on multiple effect thermal desalination processes. These comprise a cascade of evaporation-condensation processes, each subsequent process in the cascade operating at a temperature below that of the previous process in the cascade. A given evaporation-condensation process in the cascade obtains its required latent heat of evaporation from the heat of condensation resulting from a preceding higher temperature evaporation-condensation process.

Humidification dehumidification (HDH) is one form of multiple effect thermal desalination, described in Canadian Patent Application 2,816,746, the entirety of which is hereby incorporated by reference herein. In brief, an air stream is humidified by warm saltwater, which drips through a humidification zone to promote heat and mass transfer from the warm saltwater to the air stream, with said air stream having a wet bulb temperature lower than the warm saltwater temperature. The humidified air stream is then cooled by a radiator surface that is colder than the wet bulb temperature of the humidified air. As air is cooled, the air's ability to hold vapor decreases and moisture condenses on the cooler tubes while transferring its heat of condensation to the cooler saltwater inside the radiator tubes, which is then directed to the humidifier of the subsequently lower temperature effect.

Operation of the system described in Canadian Patent Application 2,816,746 may be at or above saturation. However, saturated operation increases the propensity of solids and scale to build up on internal surfaces, reducing heat transfer effectiveness and clogging flow paths resulting in performance degradation and reliability challenges. In fact, the most common reoccurring maintenance required in any humidification driven saltwater concentrating system is de-scaling the system components. Therefore, there is also a need to devise a system that efficiently and periodically removes scaling in multiple effect desalination processes.

Canadian Patent Application 2,821,453, the entirety of which is hereby incorporated by reference herein, describes one such method to periodically clean internal surfaces through a series of freshwater or chemically enhanced wash cycles based on predetermined operating criteria. Additional methods, systems, and techniques for de-scaling desalination systems continue to be developed.

SUMMARY

According to a first aspect, there is provided a multistage desalination system. The system comprises a higher stage desalination subsystem comprising a first evaporation stage for evaporating a first saltwater at a first temperature and a first condensation stage, fluidly coupled to the first evaporation stage, for condensing product water from vapor that evaporates from the saltwater in the first evaporation stage; a lower stage desalination subsystem comprising a second evaporation stage for evaporating a second saltwater at a second temperature and a second condensation stage, fluidly coupled to the second evaporation stage, for condensing product water from vapor that evaporates from the saltwater in the second evaporation stage, wherein the second temperature is lower than the first temperature; a first pump and a second pump fluidly coupled to the higher and lower stage desalination subsystems, respectively, for pumping the saltwaters through the desalination subsystems; at least one transfer conduit fluidly coupling the higher and lower stage desalination systems; and valving fluidly coupled at least to the at least one transfer conduit. The valving is configurable to operate the multistage desalination system in a normal mode in which the first and second saltwaters are evaporated and condensed in the higher and lower stage desalination subsystems, respectively, and in a swapped mode in which the first and second saltwaters are swapped and subsequently evaporated and condensed in the lower and higher stage desalination subsystems, respectively.

The system may further comprise a heat exchanger thermally coupling the first condensation stage to the second evaporation stage for transferring heat from the first condensation stage to the second evaporation stage.

Each of the higher and lower stage desalination systems may comprise a multiple-effect distillation system or a multi-stage flash distillation system.

The first evaporation stage may comprise a first humidifier, the first condensation stage may comprise a first dehumidifier, the second evaporation stage may comprise a second humidifier, and the second condensation stage may comprise a second dehumidifier. A first carrier gas for conveying the vapor evaporated in the first humidifier may flow through a first closed loop carrier gas circuit comprising the first humidifier and the first dehumidifier and a second carrier gas for conveying the vapor evaporated in the second humidifier may flow through a second closed loop carrier gas circuit comprising the second humidifier and the second dehumidifier.

The at least one transfer conduit may comprise a down-transfer conduit permitting fluid transfer from the higher stage desalination subsystem to the lower stage desalination subsystem, and operation in the normal mode may comprise pumping the first saltwater from the higher stage desalination subsystem that is not evaporated in the first evaporation stage to the second evaporation stage for further evaporation.

The at least one transfer conduit may comprise an up-transfer conduit permitting fluid transfer from the lower stage desalination subsystem to the higher stage desalination subsystem, and transitioning from the normal to the swapped modes may comprise pumping the second saltwater to the higher stage desalination subsystem via the up-transfer conduit and the first saltwater to the lower stage desalination subsystem via the down-transfer conduit.

The down-transfer conduit may pass through the first dehumidifier and be fluidly coupled to the second humidifier, and the product water may condense on to a portion of the down-transfer conduit within the first dehumidifier.

The up-transfer conduit may fluidly couple the first humidifier to a location on the down-transfer conduit between the first dehumidifier and the second humidifier.

When in the normal mode the first saltwater may flow through a first closed loop saltwater circuit comprising the first humidifier and the second saltwater may flow through a second closed loop saltwater circuit, non-overlapping with the first closed loop saltwater circuit, comprising the down-transfer conduit and the second humidifier.

The system may further comprise a salt extraction system for extracting solid salts or an aqueous solution; brine transfer conduits fluidly coupling the salt extraction system to the first and second closed loop saltwater circuits; and brine discharge valving, located along the brine transfer conduits, operable to selectably route the first saltwater from the first closed loop saltwater circuit or the second saltwater from the second closed loop saltwater circuit to the salt extraction system.

The system may further comprise salinity sensors located along the first and second closed loop saltwater circuits; and a controller communicatively coupled to the salinity sensors and the brine discharge valving. The controller may be configured to perform a method comprising (i) determining, using the salinity sensors, the salt concentration of the first and second saltwaters; and (ii) when the salt concentration of the first or second saltwater equals or exceeds a swapping threshold: (1) transferring the second saltwater to the salt extraction system; (2) transferring to the second closed loop saltwater circuit the waste brine that the salt extraction system outputs; and (3) waiting at least a swapping period prior to again transferring the second saltwater to the salt extraction system and transferring the waste brine to the second closed loop saltwater circuit.

The swapping threshold may be the salt concentration of the first or second saltwater when at saturation.

The system may further comprise salinity sensors located along the first and second closed loop saltwater circuits; and a controller communicatively coupled to the salinity sensors and the valving. The controller may be configured to perform a method comprising determining, using the first and second salinity sensors, the salt concentration of the first and second saltwaters; when the salt concentration of the first or second saltwater meets or exceeds a swapping threshold, transitioning between the normal and swapped modes; and waiting at least a swapping period prior to again transitioning between the normal and swapped modes.

The swapping threshold may be the salt concentration of the first or second saltwater when at saturation.

The first humidifier may comprise a first drainage basin and the second humidifier may comprise a second drainage basin, and the method may further comprise, prior to transitioning between the normal and swapped modes, draining at least some of the first and second saltwaters into the first and second drainage basins, respectively, by slowing the pump.

The brine discharge valving may also be operable to return waste brine that the salt extraction system outputs to the first or second closed loop saltwater circuits and the method may further comprise, after transitioning between the normal and swapped modes transferring the saltwater in the first closed loop saltwater circuit to the salt extraction system; and transferring to the first closed loop saltwater circuit the waste brine that the salt extraction system outputs.

The system may further comprise a pressure or flow sensor located along the first or second closed loop saltwater circuit; and a controller communicatively coupled to the pressure or flow sensor and the valving. The controller may be configured to perform a method comprising determining, using the pressure or flow salinity sensor, the pressure or flow rate within the first or second closed loop saltwater circuit; when the pressure or flow rate equals or exceeds a swapping threshold, transitioning between the normal and swapped modes; and waiting at least a swapping period prior to again transitioning between the normal and swapped modes.

A controller may be communicatively coupled to the valving and configured to transition between the normal and swapped modes in response to elapsed time of desalination.

The controller may wait different times to transition from the normal mode to the swapped mode and to transition from the swapped mode to the normal mode.

When in the normal mode the first saltwater may flow through a first closed loop saltwater circuit comprising the first humidifier and a first saltwater reservoir and the second saltwater may flow through a second closed loop saltwater circuit, non-overlapping with the first closed loop saltwater circuit, comprising the second humidifier and a second saltwater reservoir, and swapping from the normal mode to the swapped mode may comprise configuring the valving so the first humidifier is fluidly coupled to the second saltwater reservoir and so the second humidifier is fluidly coupled to the first saltwater reservoir.

The at least one transfer conduit may comprise a down-transfer conduit permitting fluid transfer from the higher stage desalination subsystem to the lower stage desalination subsystem, and operation in the normal mode may comprise pumping the first saltwater from the higher stage desalination subsystem that is not evaporated in the first evaporation stage to the second evaporation stage for further evaporation.

The down-transfer conduit may pass through the first dehumidifier and be fluidly coupled to the second humidifier, and the product water may condense on to a portion of the down-transfer conduit within the first dehumidifier.

The system may further comprise a first and a second salt extraction system for extracting solid salts or an aqueous solution, and the first and the second salt extractions systems may comprise the first and the second saltwater reservoirs, respectively.

The system may further comprise a salinity sensor located along the first and second closed loop saltwater circuit; and a controller communicatively coupled to the salinity sensors and the valving. The controller may be configured to perform a method comprising determining, using the salinity sensor, the salt concentration of the first and second saltwater; when the salt concentration of the first or the second saltwater equals or exceeds a swapping threshold, transitioning between the normal and the swapped modes; and waiting at least a swapping period prior to again transitioning between the normal and swapped modes.

The swapping threshold may be the salt concentration of the second saltwater when at saturation.

The system may further comprise a pressure or flow sensor located along the first or second closed loop saltwater circuit; and a controller communicatively coupled to the pressure or flow sensor and the valving. The controller may be configured to perform a method comprising determining, using the pressure or flow salinity sensor, the pressure or flow rate within the first or second closed loop saltwater circuit; when the pressure or flow rate equals or exceeds a swapping threshold, transitioning between the normal and swapped modes; and waiting at least a swapping period prior to again transitioning between the normal and swapped modes.

The system may further comprise a controller communicatively coupled to the valving, and the controller may be configured to transition between the normal and swapped modes in response to elapsed time of desalination.

The controller may wait different times to transition from the normal mode to the swapped mode and to transition from the swapped mode to the normal mode.

According to another aspect, there is provided a method for reducing scaling in a multistage desalination system comprising higher and lower stage desalination subsystems. The method comprises desalinating a first saltwater in a higher stage desalination subsystem, wherein desalinating the first saltwater comprises evaporating the first saltwater at a first temperature and condensing product water from vapor that evaporates from the first saltwater; desalinating a second saltwater in a lower stage desalination subsystem, wherein desalinating the second saltwater comprises evaporating the second saltwater at a second temperature lower than the first temperature and condensing product water from vapor that evaporates from the second saltwater; and swapping the first and second saltwaters.

The method may further comprise prior to desalinating the second saltwater, transferring heat released by condensation of the product water in the higher stage desalination subsystem to the second saltwater.

Each of the higher and lower stage desalination systems may comprise a multiple-effect distillation system or a multistage flash distillation system.

The higher stage desalination subsystem may comprise a first humidifier for evaporating the first saltwater and a first dehumidifier for condensing the product water from the vapor that evaporates from the first saltwater; the lower stage desalination subsystem may comprise a second humidifier for evaporating the second saltwater and a second dehumidifier for condensing the product water from the vapor that evaporates from the second saltwater; desalinating the first saltwater may comprise conveying from the first humidifier to the first dehumidifier, via a first carrier gas, the vapor evaporated from the first saltwater, wherein the first carrier gas flows through a first closed loop carrier gas circuit comprising the first humidifier and the first dehumidifier; and desalinating the second saltwater may comprise conveying from the second humidifier to the second dehumidifier, via a second carrier gas, the vapor evaporated from the second saltwater, wherein the second carrier gas flows through a second closed loop carrier gas circuit comprising the second humidifier and the second dehumidifier.

The method may further comprise, after evaporating the first saltwater in the higher stage desalination subsystem, transferring the first saltwater to the second evaporation stage and then further evaporating the first saltwater in the second evaporation stage.

The method may further comprise determining the salt concentration of the second saltwater; and when the salt concentration of the second saltwater meets or exceeds a swapping threshold, extracting solid salts or an aqueous solution from the second saltwater.

The second saltwater may flow through a second closed loop saltwater circuit comprising the second humidifier during desalination, and extracting the solid salts or the aqueous solution from the second saltwater may comprise transferring the second saltwater to a salt extraction system and using the salt extraction system to extract the solid salts or the aqueous solution; and transferring to the second closed loop saltwater circuit waste brine that the salt extraction system outputs.

The swapping threshold may be the salt concentration of the first or second saltwater when at saturation.

The method may further comprise determining the salt concentration of the first and second saltwaters, wherein the first and second saltwaters are swapped when the salt concentration of the first or second saltwaters meets or exceeds a swapping threshold; and waiting at least a swapping period prior to again swapping the first and second saltwaters.

The swapping threshold may be the salt concentration of the second saltwater being at saturation.

During desalination, the first saltwater may circulate through a first closed loop saltwater circuit comprising the first humidifier and the second saltwater may circulate through a second closed loop saltwater circuit comprising the second humidifier, and swapping the first and second saltwaters may comprise slowing circulation of the first and second saltwaters through the first and second closed loop saltwater circuits, respectively; purging one of the first and second saltwaters from one of the first and second humidifiers, respectively; and transferring the other of the first and second saltwaters to the humidifier that was purged.

Purging may comprise one or both of draining the one of the first and second saltwaters into a drainage basin and injecting compressed air into the one of the first and second humidifiers.

The method may further comprise after swapping the first and second saltwaters, extracting solid salts or an aqueous solution from the saltwater in the first closed loop saltwater circuit.

Extracting the solid salts or the aqueous solution from the saltwater in the first closed loop saltwater circuit may comprise transferring the saltwater in the first closed loop saltwater circuit to the salt extraction system and using the salt extraction system to extract the solid salts or the aqueous solution; and transferring to the first closed loop saltwater circuit the waste brine that the salt extraction system outputs.

The method may further comprise determining the salt concentration of the first and second saltwaters, wherein the first and second saltwaters are swapped when the salt concentration of the first or second saltwaters meets or exceeds a swapping threshold; and waiting at least a swapping period prior to again swapping the first and second saltwaters.

The swapping threshold may be the salt concentration of the first or second saltwater when at saturation.

The method may further comprise determining the pressure or flow rate within the first or second closed loop saltwater circuits, wherein the first and second saltwaters are swapped when the pressure or flow rate exceeds a swapping threshold; and waiting at least a swapping period prior to again swapping the first and second saltwaters.

The method may further comprise swapping the first and second saltwaters in response to elapsed time of desalination.

During desalination, the first saltwater may circulate through a first closed loop saltwater circuit comprising the first humidifier and a first saltwater reservoir and the second saltwater may circulate through a second closed loop saltwater circuit comprising the second humidifier and a second saltwater reservoir. Swapping the first and second saltwaters may comprise fluidly decoupling the first humidifier and the first saltwater reservoir from each other and the second humidifier and the second saltwater reservoir from each other; fluidly coupling the first humidifier and the second saltwater reservoir together and the second humidifier and the first saltwater reservoir together; and desalinating the saltwater in the first saltwater reservoir using the lower stage desalination system and desalinating the saltwater in the second saltwater reservoir using the higher stage desalination system.

The first saltwater reservoir may comprise part of a first salt extraction system and the second saltwater reservoir may comprise part of a second salt extraction system, and the method may further comprise extracting solid salts or an aqueous solution from the first and second saltwaters using the saltwater extraction systems.

The method may further comprise determining the salt concentrations of the first and second saltwaters, wherein the first and second saltwaters are swapped when the salt concentration of the first or second saltwaters meets or exceeds a swapping threshold; and waiting at least a swapping period prior to again swapping the first and second saltwaters.

The swapping threshold may be the salt concentration of the second saltwater when at saturation.

The method may further comprise determining the pressure or flow rate within the first or second closed loop saltwater circuits, wherein the first and second saltwaters are swapped when the pressure or flow rate exceeds a swapping threshold; and waiting at least a swapping period prior to again swapping the first and second saltwaters.

The method may further comprise swapping the first and second saltwaters in response to elapsed time of desalination.

According to another aspect, there is provided a non-transitory computer readable medium having encoded thereon statements and instructions to cause a controller to perform any of the foregoing aspects of the method or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Embodiments described herein are directed to a multi-effect thermal desalination system arranged for changing the order in which physical thermal desalination subsystems are applied in a multi-effect thermal desalination system. The term "multi-effect thermal desalination system" is used herein to describe a thermal desalination system comprising more than one thermal desalination subsystem and therefore more than one associated desalination process stage. An example embodiment of the system and method disclosed herein is based on a multi-effect humidification dehumidification (HDH) thermal desalination system. At least some of the embodiments described herein are directed to reducing the frequency of or need for washing the desalination system, and to mitigating the negative consequences of adding freshwater to a solution being concentrated.

Figure 1:
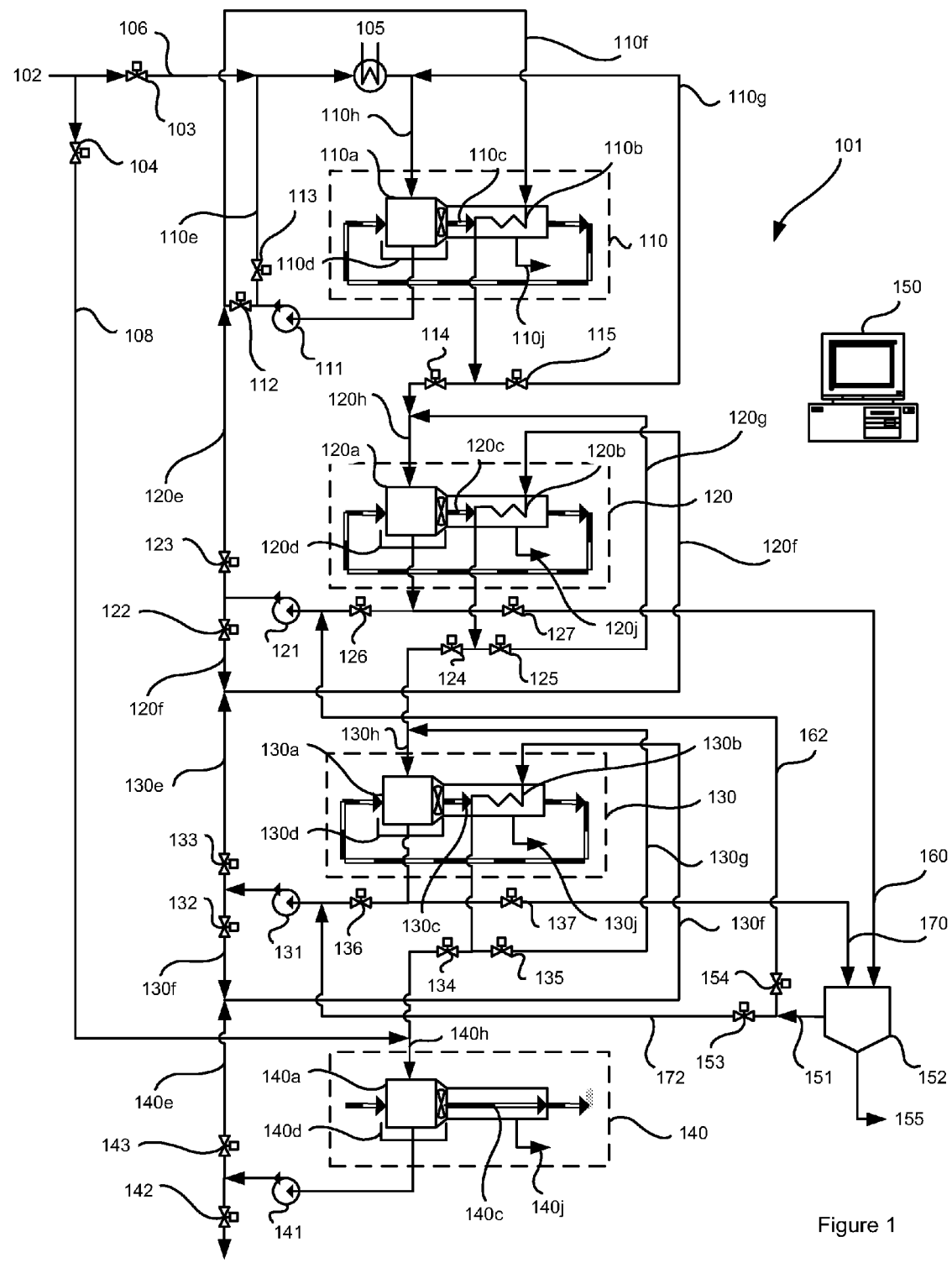
FIG. 1 shows a multi-effect thermal desalination system, according to one embodiment.

FIG. 1 shows a first example embodiment of a four stage multi-effect HDH thermal desalination system 101, comprising first through fourth distinct thermal desalination subsystems 110,120,130,140, each arranged for executing a desalination stage in a "four stage" or "four effect" thermal desalination process. In a first configuration, desalination subsystems 110,120,130,140 are arranged in order of decreasing saltwater circuit temperature.

First thermal desalination subsystem 110 comprises a first humidification zone 110a and a first dehumidification zone 110b. A first closed loop carrier gas circuit 110c is maintained through zones 110a and 110b. For the sake of simplicity and cost, the carrier gas may be atmospheric air, but in other embodiments, the carrier gas may be sub-atmospheric pressure air or helium to increase capacity per unit volume at the expense of added complexity. A first basin 110d is disposed to collect water not evaporated in first humidification zone 110a. First saltwater to be desalinated flows in conduit 110h via first basin 110d, first pump 111, and valve 113, and is heated in heater subsystem 105 to a first and highest temperature $T_1$ of the system 101.

The heated first saltwater from conduit 110h is evaporated in first humidification zone 110a and the evaporated water is borne along by the carrier gas in first closed loop carrier gas circuit 110c. Heat of evaporation is lost from the heated first saltwater as it is evaporated in passing through first humidification zone 110a; that is, the first saltwater that remains in its liquid state loses heat as a result of evaporation. The humidified carrier gas in first closed loop carrier gas circuit 110c is passed to first dehumidification zone 110b. Here the water vapor condenses out of first closed loop carrier gas circuit 110c and transfers heat of condensation to a second closed loop saltwater circuit, described below, via valve 114 and conduit 120h. The condensed pure water is output on first condensed water output 110j. The saltwater from conduit 120h is then used as input saltwater circuit for second thermal desalination subsystem 120. The carrier gas keeps circulating in first closed loop carrier gas circuit 110c through the first humidification zone 110a and first dehumidification zone 110b under the action of thermal convection and/or applied motive pressure via a suitable fan.

The primary saltwater feed for thermal desalination subsystem 110 is the raw saltwater input 102 to the overall system 101 via valve 103 and conduit 106. The fourth thermal desalination subsystem 140 similarly takes as its primary saltwater feed the raw saltwater input 102 to the overall system 101 via valve 104 and conduit 108. For this reason first and fourth thermal desalination subsystems 110 and 140 operate at lower salt concentration levels than second and third desalination subsystems 120 and 130.

The second saltwater in conduit 120h of the second closed loop saltwater circuit of second thermal desalination subsystem 120 is at a second and lower saltwater temperature $T_2$ than the first temperature $T_1$ and enters second thermal desalination subsystem 120, similar in construction to the first thermal desalination subsystem 110. Second saltwater to be desalinated in second thermal desalination subsystem 120 flows in the second closed loop saltwater circuit via conduit 120h, second humidification zone 120a, second basin 120d, valve 126, second pump 121, valve 123, conduit 120e, conduit 110f, first dehumidification zone 110b, and valve 114. The second saltwater evaporates in second humidification zone 120a into the carrier gas circulating in second closed loop carrier gas circuit 120c, and is then condensed in second dehumidification zone 120b, heating saltwater in a third closed loop saltwater circuit, described below, feeding third thermal desalination subsystem 130 via valve 124 and conduit 130h. The condensed pure water is output on first condensed water output 120j. The water in a third closed loop saltwater circuit of third thermal desalination subsystem 130 is at a third temperature $T_3$, lower than the second temperature $T_2$. The carrier gas keeps circulating in second closed loop carrier gas circuit 120c through the second humidification zone 120a and second dehumidification zone 120b under the action of thermal convection and/or applied motive pressure via a suitable fan.

Third saltwater to be desalinated in third thermal desalination subsystem 130 flows in the third closed loop saltwater circuit from 130h via third humidification zone 130a, third basin 130d, valve 136, second pump 131, valve 133, conduit 130e, conduit 120f, second dehumidification zone 120b, and valve 124. The third saltwater evaporates in third humidification zone 130a into the carrier gas circulating in third closed loop carrier gas circuit 130c, and is then condensed in third dehumidification zone 130b. This process heats a fourth saltwater in a fourth closed loop saltwater circuit feeding fourth thermal desalination subsystem 140 via valve 134 and conduit 140h. The condensed pure water is output on first condensed water output 130j. The fourth saltwater in a fourth closed loop saltwater circuit of fourth thermal desalination subsystem 140 is at a fourth temperature $T_4$, lower than the third temperature $T_3$. The carrier gas keeps circulating in third closed loop carrier gas circuit 130c through the third humidification 130a zone and third dehumidification 130b zone under the action of thermal convection and/or applied motive pressure via a suitable fan.

In the depicted example embodiment the fourth thermal desalination subsystem 140 is also fed directly via valve 104 from the saltwater input to the overall system 101.

Fourth saltwater in the fourth closed loop saltwater circuit of fourth thermal desalination subsystem 140 evaporates in fourth humidification zone 140a into the carrier gas moving through open carrier gas circuit 140c. The fourth saltwater continues circulating in the fourth closed loop saltwater circuit defined by conduit 140h, fourth humidification zone 140a, pump 141, valve 143, conduit 140e, conduit 130f, third dehumidification zone 130b, and valve 134. Saltwater can be transferred from fourth thermal desalination subsystem 140 to discharge by closing the valve 143 and opening the discharge valve 142. Carrier gas circuit 140c has an open configuration in order to dispose of the heat in system 101, which, if 140c were a closed carrier gas circuit, would build up and disturb the thermal balance of the temperature cascade of the four desalination subsystems, leading to overheating of system 101.

In the above arrangement, typical temperatures may be as follows, assuming a heat source 105 temperature of 82 to 85° C. The temperature of first saltwater entering first humidification zone 110a may be $T_1=80°$ C., because of heating in heater subsystem 105. The temperature of second saltwater in first dehumidification zone 110b and second humidification zone 120a may be $T_2=70°$ C. The temperature of third saltwater in second dehumidification zone 120b and third humidification zone 130a may be $T_3=60°$ C. The temperature of fourth saltwater in third dehumidification zone 130b and fourth humidification zone 140a may be $T_4=50°$ C. A desalination subsystem that has a higher operating temperature than another of the desalination subsystems is referred to as being a "higher stage" desalination subsystem relative to that other desalination subsystem. For example, the first desalination subsystem 110 is a higher stage desalination subsystem relative to the second through fourth desalination subsystems 120,130,140. Analogously, a desalination subsystem that has a lower operating temperature than another of the desalination subsystems is referred to as being a "lower stage" desalination subsystem relative to that other desalination subsystem. For example, the fourth desalination subsystem 140 is a lower stage desalination subsystem relative to the first through third desalination subsystems 110,120,130. As another example, the second desalination subsystem 120 is a higher stage desalination subsystem relative to the third desalination subsystem 130 and a lower stage desalination subsystem relative to the first desalination subsystem 110.

The flow pattern described thus far represents the default closed circuit operating configuration of the system 101, in which the highest temperatures are attained in thermal desalination subsystem 110, and the lowest in thermal desalination subsystem 140, while the highest salt concentrations are attained in thermal desalination subsystem 130, and the lowest salt concentrations are attained in thermal desalination subsystems 110 and 140, while a medium level of salt concentration is maintained in thermal desalination subsystem 120. The closed circuit saltwater circuit through the humidification zone 120a,130a,140a of each respective thermal desalination subsystem 120,130,140 passes through the dehumidification zone 110b,120b,130b of the thermal desalination subsystem 110,120,130 disposed before it in the temperature cascade of system 101 and collects heat from that desalination subsystem before it in the thermal cascade of system 101. Thermal desalination subsystem 110 is the exception in this regard, and circulates its saltwater directly back to its humidification zone 110a, there being no preceding desalination subsystem to it within system 101. Subsystem 110 may be heated by an external heat source (not shown).

Within this arrangement, the first saltwater in the first closed loop saltwater circuit through humidification zone 110a increases in concentration until a predetermined set point is attained. Suitable standard salinity sensors such as conductivity meters may be employed to measure the salinity. The first saltwater is then transferred to the second closed loop saltwater circuit through humidification zone 120a, where the salt concentration is increased to a medium concentration level. This saltwater is now referred to as second saltwater. When the salt concentration of the second saltwater reaches the medium salt concentration set point, the second saltwater is transferred from the second closed loop saltwater circuit to the third closed loop saltwater circuit through humidification zone 130a, and is now referred to as third saltwater. The salt concentration increases in the third closed loop saltwater circuit until it reaches saturation, at which point valves 137 and 153 are opened and valve 136 closed. This allows the highly concentrated brine and salt mix to be transferred from the third closed loop saltwater circuit on conduit 170 to salt extraction system 152, where one or both of salt solids and an aqueous solution are extracted and the remaining brine returned to the third closed loop saltwater circuit via conduit 151, valve 153 and conduit 172. At this time valves 127 and 154 are closed and valve 126 is opened to prevent fluid exchange between the second closed loop saltwater circuit and the salt extraction system 152: i.e., to prevent brine from being transferred on conduit 160 from the second closed loop saltwater circuit to the salt extraction system 152 and from being returned from salt extraction system 152 to the second closed loop saltwater circuit via conduit 151, valve 154 and conduit 162. This disclosure refers to the above operation of the system 101 as "Normal Mode".

In the above normal mode, typical salt concentrations may be 100,000 mg/L in the first and fourth closed loop saltwater circuits through conduits 110h and 140h, respectively, while the salt concentration in the second closed loop saltwater circuit through conduit 120h may be 250,000 mg/L and the salt concentration in the third closed loop saltwater circuit through conduit 130h may be 350,000 mg/L.

The valving arrangements for transferring saltwater downward in the thermal cascade of thermal desalination subsystems 110,120,130,140, as employed in the description immediately above. This process is referred to in the present description as "blow-down", as the saltwater is moved from a higher temperature thermal desalination subsystem to a lower temperature desalination subsystem.

Referring to the highest temperature desalination subsystem, being 110. To effect the blow-down, valve 113 may be shut and valve 112 opened. With valve 123 shut, the saltwater from humidification zone 110a proceeds via basin 110d, pump 111 and valve 112 and along conduit 110f to dehumidifier 110b and via an open valve 114 and conduit 120h to the humidifier 120a of desalination subsystem 120.

In equivalent fashion, saltwater may be transferred from humidifier 120a of desalination subsystem 120 to humidifier 130a of desalination subsystem 130. This is achieved by shutting valves 127, 123, and 133, and opening valves 126 and 122. Under these circumstances, the saltwater in humidifier 120a of desalination subsystem 120 is moved via basin 120d, valve 126, pump 121, valve 122, conduit 120f, dehumidifier 120b, valve 124, and conduit 130h to humidifier 130a of desalination subsystem 130.

In equivalent fashion, saltwater may be transferred from humidifier 130a of desalination subsystem 130 to humidifier 140a of desalination subsystem 140. This is achieved by shutting valves 137, 133, and 143, and opening valves 136 and 132. Under these circumstances, the saltwater in humidifier 130a of desalination subsystem 130 is moved via basin 130d, valve 136, pump 131, valve 132, conduit 130f, dehumidifier 130b, valve 134, and conduit 140h to humidifier 140a of desalination subsystem 140.

There is no blow-down process from desalination subsystem 140 as it is the last one in the temperature cascade of system 101.

The valving arrangement for transferring saltwater upward in the thermal cascade of thermal desalination subsystems 110,120,130,140 is now considered. This process is referred to in the present specification as "blow-up", as the saltwater is moved from a lower temperature thermal desalination subsystem to a higher temperature desalination subsystem.

Consider first the lowest temperature desalination subsystem, being the fourth desalination subsystem 140. To effect the blow-up process, valves 142, 132, and 134 may be shut and valves 143 and 135 opened. Saltwater from humidifier 140a of desalination subsystem 140 is now forced via basin 140d, pump 141, valve 143, conduit 140e, conduit 130f, dehumidifier 130b, valve 135, conduit 130g, and conduit 130h to humidifier 130a of desalination subsystem 130.

In equivalent fashion, saltwater may be transferred from humidifier 130a of the third desalination subsystem 130 to humidifier 120a of the second desalination subsystem 120. This is achieved by shutting valves 137, 132, 122, and 124, and opening valves 136, 133 and 125. Saltwater from humidifier 130a of the third desalination subsystem 130 is now forced via basin 130d, valve 136, pump 131, valve 133, conduit 130e, conduit 120f, dehumidifier 120b, valve 125, conduit 120g, and conduit 120h to humidifier 120a of the second desalination subsystem 120.

In equivalent fashion, saltwater may be transferred from humidifier 120a of the second desalination subsystem 120 to humidifier 110a of the first desalination subsystem 110. This is achieved by shutting valves 127, 122, 112, and 114, and opening valves 126, 123 and 115. Saltwater from humidifier 120a of desalination subsystem 120 is now forced via basin 120d, valve 126, pump 121, valve 123, conduit 120e, conduit 110f, dehumidifier 110b, valve 115, conduit 110g, and conduit 110h to humidifier 110a of the first desalination subsystem 110.

There is no blow-up process from the first desalination subsystem 110, as it is the highest temperature desalinator in the temperature cascade of system 101.

As may be seen from the above detailed explanation, conduits 110g, 120g, and 130g may be viewed as the blow-up conduits, while conduits 110f, 120f, and 130f may be seen as the blow-down conduits, though the use of the latter is not restricted to blow-down only, being employed also in normal closed circuit circulation. In the present disclosure, the conduits 110g, 120g, and 130g are referred to as "up-transfer conduits", and the conduits 110f, 120f, and 130f as are referred to as "down-transfer conduits".

On the basis of the valving arrangements described above, any fluid transfer process, whether "blow-up"/"up-transfer" or "blow-down"/"down-transfer", between any two mutually adjacent desalination subsystems in system 101 may be conducted independently from whatever processes may be in operation in the remaining desalination subsystems in system 101. In the present disclosure, a reference to a "fluid" may be a reference to one or both of a liquid and a gas.

In FIG. 1, the first down-transfer conduit 110f passes through the first dehumidifier 110b, thereby permitting heat transfer from the first dehumidifier 110b to the first saltwater prior to the first saltwater being transferred to the second desalination subsystem 120; the second down-transfer conduit 120f passes through the second dehumidifier 120b, thereby permitting heat transfer from the second dehumidifier 120b to the first saltwater prior to the second saltwater being transferred to the third desalination subsystem 130; and the third down-transfer conduit 130f passes through the third dehumidifier 130b, thereby permitting heat transfer from the third dehumidifier 130b to the third saltwater prior to the first saltwater being transferred to the fourth desalination subsystem 140. Routing the down-transfer conduits 110f,120f, 130f through the dehumidifiers 110b,120b,130b in this manner effectively makes them heat exchangers that allow the heat of condensation from a higher stage desalination subsystem to be used for evaporation in a lower stage desalination subsystem. In alternative embodiments (not depicted), a different type of heat exchanger may be used, or no heat exchanger at all may be used. For example, in one non-depicted alternative embodiment, the down-transfer conduits $110f,120f,130f$ do not pass through any of the dehumidifiers $110b,120b,130b$ and the heat of condensation from a higher stage desalination subsystem is not used for lower stage evaporation.

As the system 101 operates in its default or normal mode described above, it may build-up scale on internal surfaces; in particular build-up may occur in the desalination subsystem operating with the highest salt concentration saltwater. In normal mode this subsystem is thermal desalination subsystem 130, and in particular build-up occurs on its humidifier 130a. It is beneficial to periodically lower the operating concentration of the desalination subsystem that has been operating at a saturated level. This way the desalination subsystem can de-scale by operating at a less than saturated concentration.

The periodic lowering of the salt concentration in the desalination subsystem with the highest default salt concentration is accomplished in what is termed in this disclosure "swapped mode" to prevent irreversible solid and scale build up on internal surfaces. In the embodiment of FIG. 1, in swapped mode the third saltwater in the third closed loop saltwater circuit of third thermal desalination subsystem 130 is swapped with the second saltwater in the second closed loop saltwater circuit of second thermal desalination subsystem 120, and the closed loop saltwater circuits of thermal desalination subsystems 120 and 130 are altered such that salt extraction system 152 becomes part of the second closed loop saltwater circuit of second thermal desalination subsystem 120. In particular, valves 127 and 154 are opened and valve 126 closed. Saturated saltwater and salts are transferred to salt extraction system 152 via conduit 160 for salt extraction via conduit 155 as one or both of solid salts and an aqueous solution. The remaining brine is returned to the second closed loop saltwater circuit of second thermal desalination subsystem 120 via conduit 151, valve 154 and conduit 162. The salt extraction system 152 is disengaged from the third closed loop saltwater circuit of third thermal desalination subsystem 130 by shutting valves 137 and 153 and opening valve 136, allowing the third closed loop saltwater circuit to bypass the salt extraction circuit.

Figure 2:
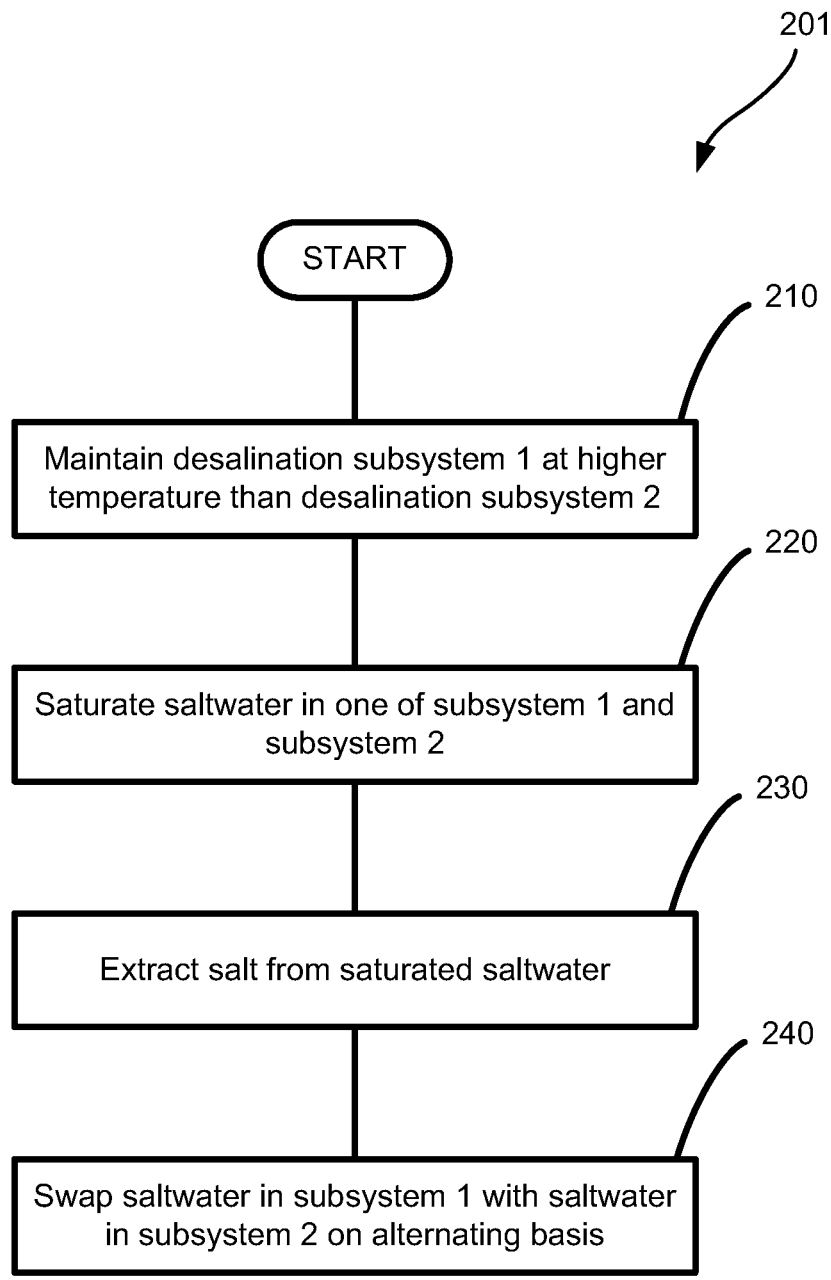
FIG. 2 shows a flow diagram for a method of de-scaling a multi-effect thermal desalination system, according to another embodiment.

In respect of the embodiment of FIG. 1, the specific method for swapping saltwater between the closed loop saltwater circuits of desalination subsystems 120 and 130 is as follows, as shown in FIG. 2. Firstly, the circulation of saltwater in the closed loop saltwater circuit of third thermal desalination subsystem 130 is interrupted by slowing (and, in one embodiment, slowing to the point of stopping) stopping pump 131 and leaving the circulation off for an idle period to allow drainage of saltwater to basin 130d. Alternatively, humidifier 130a may be purged of saltwater by injecting compressed air into humidifier 130a. Secondly, after the idle period, the saltwater in the second closed loop saltwater circuit of thermal desalination subsystem 120 is transferred to thermal desalination subsystem 130 via down-transfer conduit $120f$ by opening and closing the valves as described above for blow-down or down-transfer, and the saltwater in the third closed loop saltwater circuit of thermal desalination subsystem 130 is transferred to thermal desalination subsystem 120 via up-transfer conduit $120g$ by opening and closing the valves as described above for blow-up or up-transfer. Thirdly, the appropriate valves are opened and closed, as described above, to place the salt extraction system 152 in the second closed loop saltwater circuit of second thermal desalination subsystem 120, and the appropriate valves are opened and closed, as described above, to remove the salt extraction system 152 from the third closed loop saltwater circuit of third thermal desalination subsystem 130. Fourthly, pumps 121 and 131 are restarted to resume closed loop operation.

Controller 150 in FIG. 1 is configured to control all the pumps and valves of system 101, as well as heater 105 and any salinity sensors, temperature sensors, pressure sensors, or flow rate sensors (not shown). For the sake of clarity in FIG. 1, controller 150 is shown as a wireless device, but its communication with the various valves, pumps, sensors, gauges, and heaters may be wired communication. Controller 150 may be, without limitation, a computer or a programmable logic controller or any other suitable programmable device that can switch on and off pumps, control their speeds, ramp-up times, ramp-down times, that can obtain data from sensors, and can open and shut valves based on time or input information. For example, the controller 150 may comprise a processor, a microprocessor, microcontroller, programmable logic controller, or an application-specific integrated circuit. For example, in one alternative embodiment, the controller 150 collectively comprises a processor communicatively coupled to a non-transitory computer readable medium that has encoded on it program code to cause the processor to control the system 101. Examples of computer readable media are non-transitory and include disc-based media such as CD-ROMs and DVDs, magnetic media such as hard drives and other forms of magnetic disk storage, semiconductor based media such as flash media, random access memory, and read only memory. Any of the methods described herein that the controller 150 may perform, such as the method of FIG. 2, may be stored on the non-transitory computer readable medium for execution by the controller 150.

Parameters such as drain time, pump speed, pump ramp up time, and pump ramp down time can be adjusted to avoid excessive mixing of the second saltwater and third saltwater. Required values of these parameters are primarily dependent on the volumes of basins 120d, 130d, extraction system 152, the conduits serving second thermal desalination subsystem 120, and the conduits serving third thermal desalination subsystem 130. Operation is alternated between normal and swapped modes in a periodic or intermittent manner to prevent solid and scale build-up on internal surfaces resulting in an increase in plant performance and reliability. Immediately during and after swapping, system 101 experiences a transient in the temperature balance of some of the desalination subsystems, including particularly subsystems 120 and 130. However, the transient rapidly disappears, as the temperature cascade described heretofore is re-established.

In another embodiment a method [201] is provided for reducing scaling in multistage desalination system (101) comprised of at least a first (120) and a second (130) desalination subsystem, the method comprising maintaining [210] a first closed loop saltwater circuit of the first desalination subsystem at a higher temperature than a second closed loop saltwater circuit of the second desalination subsystem; saturating [220] saltwater in one of the first and second closed loop saltwater circuits; extracting [230] salt from the saturated saltwater; and swapping [240] on an alternating basis the saturated saltwater in the one of the first and second closed loop saltwater circuits with the saltwater in the other of the first and second closed loop saltwater circuits. The extracting may be by inserting a salt extraction system in the closed loop saltwater circuit containing the saturated water.

Figure 3:
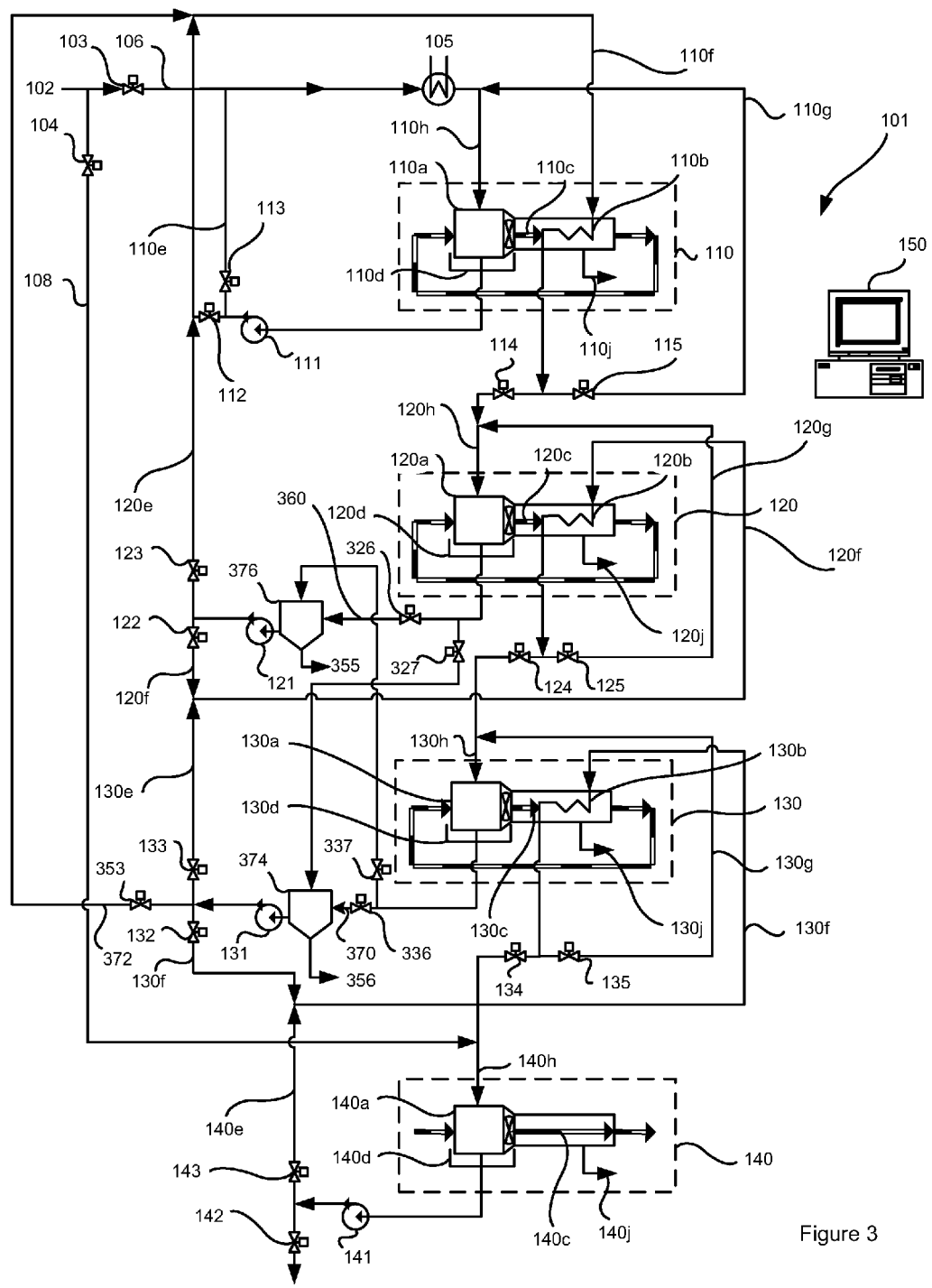
FIG. 3 shows a multi-effect thermal desalination system, according to another embodiment.

FIG. 3 shows an alternative embodiment of a four stage multi-effect HDH thermal desalination system 101, comprising four distinct thermal desalination subsystems 110,120, 130,140, each arranged for executing a desalination stage in a "four stage" or "four effect" thermal desalination process. FIG. 3 and its description are similar to FIG. 1 in all respects with one difference now described. The embodiment of FIG. 1 swaps the saltwaters in desalination subsystems 120 and 130 by slowing or stopping operation of the system 101, by then transferring the saltwaters from subsystem 120 to subsystem 130 and from subsystem 130 to subsystem 120, whereby in swapped mode salt extraction system 152 becomes a part of closed loop subsystem 120 by actuating valves 126, 137 and 153 to closed configuration and values 136, 127, and 154 to open configuration, and by then recommencing normal speed operation. The embodiment of FIG. 3 replaces salt extraction system 152 with two salt extraction systems: second effect salt extraction system 376 and third effect salt extraction system 374, each of which comprises a saltwater reservoir, and depicts desalination subsystem 120 and 130 concentration swap such that tank connections "swing" by valve actuation, changing the saltwater flow through desalination subsystems 120 and 130. As discussed in further detail below, when the embodiment of FIG. 3 is in swapped mode the second effect salt extraction system 376 is fluidly decoupled from the second desalination subsystem 120 and is fluidly coupled to the third desalination subsystem 130 while the third effect salt extraction system 374 is fluidly decoupled from the third desalination subsystem 130 and is fluidly coupled to the second desalination subsystem 120.

In a first configuration, desalination subsystems 110,120, 130,140 are arranged in order of decreasing saltwater circuit temperature, wherein first saltwater in conduit 110*h* is heated and evaporated in humidification zone 110*a* and wherein heat of evaporation is lost from the heated first saltwater as evaporated water enters first closed loop carrier gas circuit 110*c*. Water vapor condenses in first dehumidification zone 110*b* transferring heat of condensation to second closed loop saltwater via valve 114 and conduit 120*h*. Second saltwater in conduit 120*h* of closed loop thermal desalination subsystem 120 enters second humidification zone 120*a* and second dehumidification zone 120*b* by similar configuration to first desalination subsystem 110. Latent heat of evaporation is transferred from evaporated second saltwater to the third saltwater in the third saltwater closed loop conduit 120*f* by heat of condensation, similar in configuration to desalination subsystem 101. Second saltwater enters second effect salt extraction system 376 via value 326 to conduit 360 where second saltwater flows back to desalination subsystem 101 in closed loop conduit 120*e* to first dehumidification zone 110*b*. As described above in respect of the embodiment of FIG. 1, any suitable heat exchanger may be used to transfer the heat of condensation from a higher stage to a lower stage for use in evaporation, and in at least some non-depicted alternative embodiments the heat of condensation from a higher stage is not used for evaporation in a lower stage.

Third saltwater in conduit 130*h* flows through the third closed loop saltwater circuit of thermal desalination subsystem 130. Third saltwater at a lower temperature than both the first and second saltwaters in conduit 130*h* enters third effect salt extraction system 374 via valve 336 and conduit 370. Condensation occurs on conduit 130*f*, thus transferring heat to the saltwater entering the fourth desalination subsystem 140. This disclosure refers to the above operation of the system 101 as "Normal Mode".

Valve configuration for the transferring of saltwater down the thermal desalination subsystems 110,120,130,140, as described in first configuration above, is referred to as "blow-down". The blow-down involves saltwater transfer from higher temperature thermal desalination subsystems to lower temperature desalination subsystem in a process configuration similar to FIG. 1. The highest temperature saltwater of thermal desalination subsystem 110 is transferred via closed loop conduits to lower temperature thermal desalination subsystem 120, which transfers saltwater via closed loop conduit to the thermal desalination subsystem 130. Saltwater of thermal desalination subsystem 130 is transferred to the lowest temperature thermal desalination subsystem 140. Alternative valve configuration for fluid transfer "blow-down" process, as described above, may occur and be conducted between any two adjacent thermal desalination subsystems described in desalination system 101. Operation of the system 101 in "normal mode" includes periodic blow-down of saltwater from a higher stage desalination subsystem to a lower stage desalination subsystem.

The valve configuration for the transferring of saltwater up the thermal desalination subsystems 110,120,130,140 is now considered. This process is referred to as "blow-up" and involves saltwater transfer from the lowest temperature thermal desalination subsystems to higher temperature desalination subsystems in a process configuration similar to FIG. 1. One valve arrangement basis is to transfer the lowest temperature saltwater of thermal desalination subsystem 140 via closed loop conduit to the higher temperature thermal desalination subsystem 130. Saltwater in closed loop thermal desalination subsystem 130 flows to higher temperature thermal desalination subsystem 120, which transfers cooler temperature saltwater via closed loop conduits to the highest temperature thermal desalination subsystem 110. Alternative valve configuration for fluid transfer "blow-down" process, as described above, may occur and be conducted between any two adjacent thermal desalination subsystems described in system 101.

As described above in respect of the embodiment of FIG. 1 it is beneficial to alter saltwater concentrations in desalination subsystems 120 and 130 to reduce solids or scale build up on wetted parts of the desalination subsystems operating at relatively high salt concentrations; this can be done by alternating between "Normal Mode" and "Swapped Mode".

When the embodiment of FIG. 3 is in normal mode, the second effect salt extraction system 376 is fluidly coupled to the second desalination subsystem 120 and accordingly comprises part of the second closed loop saltwater circuit while the third effect salt extraction system 374 is fluidly coupled to the third desalination subsystem 130 and accordingly comprises part of the third closed loop saltwater circuit. As mentioned above, when the embodiment of FIG. 3 is in swapped mode, the second effect salt extraction system 376 is fluidly decoupled from the second desalination subsystem 120 and is fluidly coupled to the third desalination subsystem 130 while the third effect salt extraction system 374 is fluidly decoupled from the third desalination subsystem 130 and is fluidly coupled to the second desalination subsystem 120. This permits the saltwater in the second effect salt extraction system 376 to be pumped through the third desalination subsystem 130 and the saltwater in the third effect salt extraction system 374 to be pumped through the second desalination subsystem 120 while the subsystems 120 and 130 are performing desalination without needing to move the relatively large volumes of saltwater between the subsystems 120 and 130 while they have effectively been paused, as in the embodiment of FIG. 1. Additionally, when swapping using the embodiment of FIG. 3, mixing or cross-contamination between saltwaters in the second and third closed loop saltwater circuits is typically less of a problem than in the embodiment of FIG. 1. For example, in the embodiment of FIG. 1 residual saltwater remaining in the salt extraction system 152 after transitioning to swapped mode and performing a "blow-up" may result in unwanted mixing between closed loop saltwater circuits, whereas residual saltwater in the salt extraction systems 372,374 of FIG. 3 after transitioning from normal to swapped modes typically does not present a practical cross-contamination problem.

The third saltwater in the third closed loop saltwater circuit of third thermal desalination subsystem 130 is swapped with the second saltwater in the second closed loop saltwater circuit of second thermal desalination subsystem 120 as follows. Initiation of swap mode stops pump 131, discontinues closed loop flow to allow drainage into basin 130d, and closes valves 336 and 133 on conduits 370 and 130e, respectively. After an idle circulation period, the second saltwater in second closed loop saltwater circuit of thermal desalination subsystem 120 is redirected to the third closed loop saltwater circuit of thermal desalination subsystem 130 by opening valves 122 and 337 to permit saltwater to flow through conduits 120f and 130h back to second effect salt extraction system 376. Simultaneously, pump 121 discontinues flow through second saltwater closed loop circuit to drainage saltwater to basin 120d, closes valves 123 and 326 and opens valves 327 and 353 to redirect the third saltwater flow through conduit 372. The third saltwater enters the first desalination subsystem 110 via conduit 110f, flows through the second desalination subsystem 120 via valve 114 and closed loop conduit 120h, and returns to the third effect salt extraction system 374 via valve 327. Pumps 121 and 131 are then restarted to resume closed loop operation. As in the embodiment of FIG. 1, the pumps 121 and 131 may be slowed or stopped entirely to facilitate swapping.

Similar to FIG. 1, controller 150 is configured to control all pumps, all valves of system 101, heater 105, and instrumentation of system 101. More specifically, salinity, temperature, and pressure sensors (not shown) can be used to adjust operation parameters.

For the embodiments of both FIGS. 1 and 3, the inserting of the salt extraction systems into the closed loop saltwater circuits may be done on an alternating basis and the alternating basis may be time. In other embodiments, the alternating basis may one or more of pressure and flow rate in the closed loop saltwater circuit bearing saturated saltwater, as well as power drawn from the pump routing the saltwater through the circuit bearing saturated saltwater. For example, in one embodiment a salinity sensor may be placed in one or both of the first and second closed loop saltwater circuits and used to determine the salt concentrations of the first and second saltwaters, and swapping may be done when the concentration of the first or second saltwaters exceeds a swapping threshold. In another example embodiment, one or both of a pressure and flow rate monitor may be placed in at least one of the first and second closed loop saltwater circuits, and swapping may be done when the measured pressure or flow rate exceeds or is less than a swapping threshold, as appropriate. For example, in one embodiment swapping may be performed when flow rate is less than a swapping threshold and pressure exceeds a swapping threshold. In another example embodiment, when time is used to determine when to swap saltwaters, the times between swaps may be identical or alternatively the times between swaps may differ. For example, in one example embodiment a first time interval may be used to determine when to "blow-down" the saltwaters when the system 101 is operating in normal mode and has not recently swapped saltwaters, and a second time interval may be used to determine when to "blow-down" the saltwaters when the system 101 has just swapped saltwaters. As another example, the time used to determine when to transition from normal to swapped mode may be one swapping period, and the time used to determine when to transition from swapped mode to normal mode may be another swapping period, and the two swapping periods may be identical to each other or may differ from each other. When the saltwaters are swapped, there may be a delay of at least a swapping period prior to again transitioning the system 101 between the normal and swapping modes (i.e., prior to again swapping saltwaters between a higher stage desalination subsystem and a lower stage desalination subsystem) to prevent a situation where swapping inadvertently happens continuously in response to readings from, for example, salinity sensors in the first and second closed loop saltwater circuits. Heat exchanger effectiveness, as determined from temperature measurements, may also be employed as a basis of alternating. If any of the foregoing variables (e.g. pressure, flow rate, temperature) increases (e.g., in the case of pressure and temperature) or decreases (e.g., in the case of flow rate) at an accelerating rate, or meets or exceeds a swapping threshold, swapping may be initiated to prevent further performance degradation.

In the foregoing embodiments, swapping is done between two adjacent subsystems 110,120,130,140 of the system 101. However, in alternative embodiments (not depicted), swapping may be done between any of the subsystems 110,120, 130,140, and not necessarily just those that are adjacent.

The above detailed description is based on a humidification dehumidification (HDH) thermal desalination system 101. However, the method and swapped arrangement may also be applied to a steam-based desalination system such as a multistage flash distillation system or a multiple-effect distillation system, with the principle involved being the in-line swapping of a high salt concentration desalination subsystem with a similar lower concentration desalination subsystem, while simultaneously switching saltwater reservoirs (which may comprise each comprise part of a salt extraction subsystem) between the two desalination subsystems. Operation is between normal and swapped modes in a periodic manner to prevent solid and scale build-up. In general, the system and method are not limited to a particular kind of desalination system.

It is contemplated that any part of any aspect or embodiment discussed in this specification can be implemented or combined with any part of any other aspect or embodiment discussed in this specification.

FIG. 2 is a flowchart of an example method. Some of the blocks illustrated in the flowchart may be performed in an order other than that which is described. Also, it should be appreciated that not all of the blocks described in the flow chart are required to be performed, that additional blocks may be added, and that some of the illustrated blocks may be substituted with other blocks.

While particular embodiments have been described in the foregoing, it is to be understood that other embodiments are possible and are intended to be included herein. It will be clear to any person skilled in the art that modification of and adjustments to the foregoing embodiments, not shown, are possible.

The invention claimed is:
1. A multistage desalination system comprising:
(a) a higher stage desalination subsystem comprising a first evaporation stage for evaporating a first saltwater at a first temperature and a first condensation stage, fluidly coupled to the first evaporation stage, for condensing product water from vapor that evaporates from the saltwater in the first evaporation stage;

(b) a lower stage desalination subsystem comprising a second evaporation stage for evaporating a second saltwater at a second temperature and a second condensation stage, fluidly coupled to the second evaporation stage, for condensing product water from vapor that evaporates from the saltwater in the second evaporation stage, wherein the second temperature is lower than the first temperature;

(c) a first pump and a second pump fluidly coupled to the higher and lower stage desalination subsystems, respectively, for pumping the saltwaters through the desalination subsystems;

(d) at least one transfer conduit fluidly coupling the higher and lower stage desalination systems; and (e) valving fluidly coupled at least to the at least one transfer conduit, the valving configurable to operate the multistage desalination system in a normal mode in which the first and second saltwaters are evaporated and condensed in the higher and lower stage desalination subsystems, respectively, and in a swapped mode in which the first and second saltwaters are swapped and subsequently evaporated and condensed in the lower and higher stage desalination subsystems, respectively.

2. The system of claim 1 further comprising a heat exchanger thermally coupling the first condensation stage to the second evaporation stage for transferring heat from the first condensation stage to the second evaporation stage.

3. The system of claim 1, wherein each of the higher and lower stage desalination systems comprises a multiple-effect distillation system or a multi-stage flash distillation system.

4. The system of claim 1, wherein the first evaporation stage comprises a first humidifier, the first condensation stage comprises a first dehumidifier, the second evaporation stage comprises a second humidifier, and the second condensation stage comprises a second dehumidifier, and wherein a first carrier gas for conveying the vapor evaporated in the first humidifier flows through a first closed loop carrier gas circuit comprising the first humidifier and the first dehumidifier and a second carrier gas for conveying the vapor evaporated in the second humidifier flows through a second closed loop carrier gas circuit comprising the second humidifier and the second dehumidifier.

5. The system of claim 4 wherein the at least one transfer conduit comprises a down-transfer conduit permitting fluid transfer from the higher stage desalination subsystem to the lower stage desalination subsystem, and wherein operation in the normal mode comprises pumping the first saltwater from the higher stage desalination subsystem that is not evaporated in the first evaporation stage to the second evaporation stage for further evaporation.

6. The system of claim 5 wherein the at least one transfer conduit comprises an up-transfer conduit permitting fluid transfer from the lower stage desalination subsystem to the higher stage desalination subsystem, and wherein transitioning from the normal to the swapped modes comprises pumping the second saltwater to the higher stage desalination subsystem via the up-transfer conduit and the first saltwater to the lower stage desalination subsystem via the down-transfer conduit.

7. The system of claim 6 wherein the down-transfer conduit passes through the first dehumidifier and is fluidly coupled to the second humidifier, wherein the product water condenses on to a portion of the down-transfer conduit within the first dehumidifier.

8. The system of claim 7, wherein the up-transfer conduit fluidly couples the first humidifier to a location on the down-transfer conduit between the first dehumidifier and the second humidifier.

9. The system of claim 6, wherein when in the normal mode the first saltwater flows through a first closed loop saltwater circuit comprising the first humidifier and the second saltwater flows through a second closed loop saltwater circuit, non-overlapping with the first closed loop saltwater circuit, comprising the down-transfer conduit and the second humidifier.

10. The system of claim 9 further comprising:
(a) a salt extraction system for extracting solid salts or an aqueous solution;
(b) brine transfer conduits fluidly coupling the salt extraction system to the first and second closed loop saltwater circuits; and
(c) brine discharge valving, located along the brine transfer conduits, operable to selectably route the first saltwater from the first closed loop saltwater circuit or the second saltwater from the second closed loop saltwater circuit to the salt extraction system.

11. The system of claim 9 further comprising:
(a) salinity sensors located along the first and second closed loop saltwater circuits; and
(b) a controller communicatively coupled to the salinity sensors and the brine discharge valving, the controller configured to perform a method comprising:
 (i) determining, using the salinity sensors, the salt concentration of the first and second saltwaters; and
 (ii) when the salt concentration of the first or second saltwater equals or exceeds a swapping threshold:
  (1) transferring the second saltwater to the salt extraction system;
  (2) transferring to the second closed loop saltwater circuit the waste brine that the salt extraction system outputs; and
  (3) waiting at least a swapping period prior to again transferring the second saltwater to the salt extraction system and transferring the waste brine to the second closed loop saltwater circuit.

12. The system of claim 11 wherein the swapping threshold is the salt concentration of the first or second saltwater when at saturation.

13. The system of claim 10 further comprising:
(a) salinity sensors located along the first and second closed loop saltwater circuits; and
(b) a controller communicatively coupled to the salinity sensors and the valving, the controller configured to perform a method comprising:
 (i) determining, using the first and second salinity sensors, the salt concentration of the first and second saltwaters;
 (ii) when the salt concentration of the first or second saltwater meets or exceeds a swapping threshold, transitioning between the normal and swapped modes; and
 (iii) waiting at least a swapping period prior to again transitioning between the normal and swapped modes.

14. The system of claim 13 wherein the swapping threshold is the salt concentration of the first or second saltwater when at saturation.

15. The system of claim 13, wherein the first humidifier comprises a first drainage basin and the second humidifier comprises a second drainage basin, and wherein the method further comprises, prior to transitioning between the normal and swapped modes, draining at least some of the first and second saltwaters into the first and second drainage basins, respectively, by slowing the pump.

16. The system of claim 13, wherein the brine discharge valving is also operable to return waste brine that the salt extraction system outputs to the first or second closed loop saltwater circuits and wherein the method further comprises, after transitioning between the normal and swapped modes:
   (a) transferring the saltwater in the first closed loop saltwater circuit to the salt extraction system; and
   (b) transferring to the first closed loop saltwater circuit the waste brine that the salt extraction system outputs.

17. The system of claim 9 further comprising:
   (a) a pressure or flow sensor located along the first or second closed loop saltwater circuit; and
   (b) a controller communicatively coupled to the pressure or flow sensor and the valving, the controller configured to perform a method comprising:
      (i) determining, using the pressure or flow salinity sensor, the pressure or flow rate within the first or second closed loop saltwater circuit;
      (ii) when the pressure or flow rate equals or exceeds a swapping threshold, transitioning between the normal and swapped modes; and
      (iii) waiting at least a swapping period prior to again transitioning between the normal and swapped modes.

18. The system of claim 9 further comprising a controller communicatively coupled to the valving, the controller configured to transition between the normal and swapped modes in response to elapsed time of desalination.

19. The system of claim 18 wherein the controller waits different times to transition from the normal mode to the swapped mode and to transition from the swapped mode to the normal mode.

20. The system of claim 4 wherein when in the normal mode the first saltwater flows through a first closed loop saltwater circuit comprising the first humidifier and a first saltwater reservoir and the second saltwater flows through a second closed loop saltwater circuit, non-overlapping with the first closed loop saltwater circuit, comprising the second humidifier and a second saltwater reservoir, and wherein swapping from the normal mode to the swapped mode comprises configuring the valving so the first humidifier is fluidly coupled to the second saltwater reservoir and so the second humidifier is fluidly coupled to the first saltwater reservoir.

21. The system of claim 20 wherein the at least one transfer conduit comprises a down-transfer conduit permitting fluid transfer from the higher stage desalination subsystem to the lower stage desalination subsystem, and wherein operation in the normal mode comprises pumping the first saltwater from the higher stage desalination subsystem that is not evaporated in the first evaporation stage to the second evaporation stage for further evaporation.

22. The system of claim 21 wherein the down-transfer conduit passes through the first dehumidifier and is fluidly coupled to the second humidifier, wherein the product water condenses on to a portion of the down-transfer conduit within the first dehumidifier.

23. The system of claim 20 further comprising a first and a second salt extraction system for extracting solid salts or an aqueous solution, wherein the first and the second salt extractions systems comprise the first and the second saltwater reservoirs, respectively.

24. The system of claim 23 further comprising:
   (a) a salinity sensor located along the first and second closed loop saltwater circuit; and
   (b) a controller communicatively coupled to the salinity sensors and the valving, the controller configured to perform a method comprising:
      (i) determining, using the salinity sensor, the salt concentration of the first and second saltwater;
      (ii) when the salt concentration of the first or the second saltwater equals or exceeds a swapping threshold, transitioning between the normal and the swapped modes; and
      (iii) waiting at least a swapping period prior to again transitioning between the normal and swapped modes.

25. The system of claim 24 wherein the swapping threshold is the salt concentration of the second saltwater when at saturation.

26. The system of claim 20 further comprising:
   (a) a pressure or flow sensor located along the first or second closed loop saltwater circuit; and
   (b) a controller communicatively coupled to the pressure or flow sensor and the valving, the controller configured to perform a method comprising:
      (i) determining, using the pressure or flow salinity sensor, the pressure or flow rate within the first or second closed loop saltwater circuit;
      (ii) when the pressure or flow rate equals or exceeds a swapping threshold, transitioning between the normal and swapped modes; and
      (iii) waiting at least a swapping period prior to again transitioning between the normal and swapped modes.

27. The system of claim 20 further comprising a controller communicatively coupled to the valving, the controller configured to transition between the normal and swapped modes in response to elapsed time of desalination.

28. The system of claim 27 wherein the controller waits different times to transition from the normal mode to the swapped mode and to transition from the swapped mode to the normal mode.

29. A method for reducing scaling in a multistage desalination system comprising higher and lower stage desalination subsystems, the method comprising:
   (a) desalinating a first saltwater in a higher stage desalination subsystem, wherein desalinating the first saltwater comprises evaporating the first saltwater at a first temperature and condensing product water from vapor that evaporates from the first saltwater;
   (b) desalinating a second saltwater in a lower stage desalination subsystem, wherein desalinating the second saltwater comprises evaporating the second saltwater at a second temperature lower than the first temperature and condensing product water from vapor that evaporates from the second saltwater; and
   (c) swapping the first and second saltwaters by using valving that is fluidly coupled to at least one fluid transfer conduit that is fluidly coupled to the higher and lower stage desalination subsystems.

30. The method of claim 29 further comprising prior to desalinating the second saltwater, transferring heat released by condensation of the product water in the higher stage desalination subsystem to the second saltwater.

31. The method of claim 29, wherein each of the higher and lower stage desalination systems comprises a multiple-effect distillation system or a multi-stage flash distillation system.

32. The method of claim 29, wherein:
   (a) the higher stage desalination subsystem comprises a first humidifier for evaporating the first saltwater and a first dehumidifier for condensing the product water from the vapor that evaporates from the first saltwater;
(b) the lower stage desalination subsystem comprises a second humidifier for evaporating the second saltwater and a second dehumidifier for condensing the product water from the vapor that evaporates from the second saltwater;
(c) desalinating the first saltwater comprises conveying from the first humidifier to the first dehumidifier, via a first carrier gas, the vapor evaporated from the first saltwater, wherein the first carrier gas flows through a first closed loop carrier gas circuit comprising the first humidifier and the first dehumidifier; and
(d) desalinating the second saltwater comprises conveying from the second humidifier to the second dehumidifier, via a second carrier gas, the vapor evaporated from the second saltwater, wherein the second carrier gas flows through a second closed loop carrier gas circuit comprising the second humidifier and the second dehumidifier.

33. The method of claim 32 further comprising after evaporating the first saltwater in the higher stage desalination subsystem, transferring the first saltwater to the second evaporation stage and then further evaporating the first saltwater in the second evaporation stage.

34. The method of claim 32 further comprising:
(a) determining the salt concentration of the second saltwater; and
(b) when the salt concentration of the second saltwater meets or exceeds a swapping threshold, extracting solid salts or an aqueous solution from the second saltwater.

35. The method of claim 34 wherein the second saltwater flows through a second closed loop saltwater circuit comprising the second humidifier during desalination, and wherein extracting the solid salts or the aqueous solution from the second saltwater comprises:
(a) transferring the second saltwater to a salt extraction system and using the salt extraction system to extract the solid salts or the aqueous solution; and
(b) transferring to the second closed loop saltwater circuit waste brine that the salt extraction system outputs.

36. The method of claim 34, wherein the swapping threshold is the salt concentration of the first or second saltwater when at saturation.

37. The method of claim 32 further comprising:
(a) determining the salt concentration of the first and second saltwaters, wherein the first and second saltwaters are swapped when the salt concentration of the first or second saltwaters meets or exceeds a swapping threshold; and
(b) waiting at least a swapping period prior to again swapping the first and second saltwaters.

38. The method of claim 37 wherein the swapping threshold is the salt concentration of the second saltwater being at saturation.

39. The method of claim 32, wherein, during desalination, the first saltwater circulates through a first closed loop saltwater circuit comprising the first humidifier and the second saltwater circulates through a second closed loop saltwater circuit comprising the second humidifier, and wherein swapping the first and second saltwaters comprises:
(a) slowing circulation of the first and second saltwaters through the first and second closed loop saltwater circuits, respectively;
(b) purging one of the first and second saltwaters from one of the first and second humidifiers, respectively; and
(c) transferring the other of the first and second saltwaters to the humidifier that was purged.

40. The method of claim 39 wherein purging comprises draining the one of the first and second saltwaters into a drainage basin.

41. The method of claim 39 wherein purging comprises injecting compressed air into the one of the first and second humidifiers.

42. The method of claim 39 further comprising after swapping the first and second saltwaters, extracting solid salts or an aqueous solution from the saltwater in the first closed loop saltwater circuit.

43. The method of claim 42 wherein extracting the solid salts or the aqueous solution from the saltwater in the first closed loop saltwater circuit comprises:
(a) transferring the saltwater in the first closed loop saltwater circuit to the salt extraction system and using the salt extraction system to extract the solid salts or the aqueous solution; and
(b) transferring to the first closed loop saltwater circuit the waste brine that the salt extraction system outputs.

44. The method of claim 43 further comprising:
(a) determining the salt concentration of the first and second saltwaters, wherein the first and second saltwaters are swapped when the salt concentration of the first or second saltwaters meets or exceeds a swapping threshold; and
(b) waiting at least a swapping period prior to again swapping the first and second saltwaters.

45. The method of claim 44 wherein the swapping threshold is the salt concentration of the first or second saltwater when at saturation.

46. The method of claim 39 further comprising:
(a) determining the pressure or flow rate within the first or second closed loop saltwater circuits, wherein the first and second saltwaters are swapped when the pressure or flow rate exceeds a swapping threshold; and
(b) waiting at least a swapping period prior to again swapping the first and second saltwaters.

47. The method of claim 39 further comprising swapping the first and second saltwaters in response to elapsed time of desalination.

48. The method of claim 32, wherein, during desalination, the first saltwater circulates through a first closed loop saltwater circuit comprising the first humidifier and a first saltwater reservoir and the second saltwater circulates through a second closed loop saltwater circuit comprising the second humidifier and a second saltwater reservoir, and wherein swapping the first and second saltwaters comprises:
(a) fluidly decoupling the first humidifier and the first saltwater reservoir from each other and the second humidifier and the second saltwater reservoir from each other;
(b) fluidly coupling the first humidifier and the second saltwater reservoir together and the second humidifier and the first saltwater reservoir together; and
(c) desalinating the saltwater in the first saltwater reservoir using the lower stage desalination system and desalinating the saltwater in the second saltwater reservoir using the higher stage desalination system.

49. The method of claim 48 wherein the first saltwater reservoir comprises part of a first salt extraction system and the second saltwater reservoir comprises part of a second salt extraction system, and wherein the method further comprises extracting solid salts or an aqueous solution from the first and second saltwaters using the saltwater extraction systems.

50. The method of claim 48 further comprising:
(a) determining the salt concentrations of the first and second saltwaters, wherein the first and second saltwaters are swapped when the salt concentration of the first or second saltwaters meets or exceeds a swapping threshold; and
(b) waiting at least a swapping period prior to again swapping the first and second saltwaters.

51. The method of claim 50 wherein the swapping threshold is the salt concentration of the second saltwater when at saturation.

52. The method of claim 48 further comprising:
(a) determining the pressure or flow rate within the first or second closed loop saltwater circuits, wherein the first and second saltwaters are swapped when the pressure or flow rate exceeds a swapping threshold; and
(b) waiting at least a swapping period prior to again swapping the first and second saltwaters.

53. The method of claim 48 further comprising swapping the first and second saltwaters in response to elapsed time of desalination.

54. A non-transitory computer readable medium having encoded thereon statements and instructions to cause a controller to perform a method for reducing scaling in a multi-stage desalination system as claimed in claim 29.

* * * * *